Dec. 24, 1940.                A. MARCHEV                 2,225,749
                             DUPLICATING DEVICE
                          Filed Sept. 11, 1937          7 Sheets-Sheet 4

Fig.4.

Inventor:
Alfred Marchev,
By Zabel, Carlson, Gutzbaugh & Wells
Attorneys

Dec. 24, 1940.  A. MARCHEV  2,225,749
DUPLICATING DEVICE
Filed Sept. 11, 1937  7 Sheets-Sheet 6

Fig.6.

Inventor:
Alfred Marchev,
By Zabel, Carlson, Fitzbaugh & Wells
Attorneys

Patented Dec. 24, 1940

2,225,749

UNITED STATES PATENT OFFICE 2,225,749

DUPLICATING DEVICE

Alfred Marchev, La Grange, Ill., assignor to Ditto, Incorporated, Chicago, Ill., a corporation of West Virginia Application September 11, 1937, Serial No. 163,360

14 Claims. (Cl. 101—132.5)

The invention relates to duplicating devices and is particularly adapted to be embodied in a duplicating machine which comprises means for moistening copy sheets before they are applied to a master sheet to copy the data thereon.

The invention is disclosed in connection with a duplicating machine of the character described wherein master sheets have the data thereon in negative. A master sheet is prepared preferably by placing its back surface against a carbon sheet and then impressing the data on the front side of the master sheet with a typewriter or stylus, the result being that the data appears in negative on the back side of the master sheet. This is the side to which the copy sheets are applied. The solvent applied to the copy sheets is a solvent for the carbon.

One form of the invention is disclosed in a duplicating machine wherein the moistening means comprises a pair of feed rollers, means comprising a wick being provided to supply the solvent to one of the feed rollers so that it will apply the solvent to the copy sheets as it advances them to the master sheet. The means for supplying the wick with solvent comprises a perforated tube from which the solvent drops onto the wick. A manually operable device is provided for controlling the flow of the solvent through the wick in such manner that a larger amount of solvent is applied to the feed roller intermediate its ends than is applied to the ends thereof so as to compensate for the weaker pressure of the copy sheets against the master sheet by the platen roller at the intermediate portion of the platen. This insures proper distribution of the solvent upon the copy sheets to obtain copies having the copied data reproduced with substantially the same intensity over the entire surfaces thereof. The solvent is supplied to the perforated tube preferably by means which are operated automatically when the duplicating machine is in operation.

Another form of the invention is embodied in a machine which comprises a wick and feed rollers for supplying the solvent to the copy sheets. However, in this instance, one edge of the wick projects into the solvent which is held in a container.

Still another form of the invention comprises a wick and feed rollers for applying the solvent to the copy sheets. The solvent is supplied to the wick by a perforated tube, the perforations in the tube being spaced so that the central portion of the wick receives a larger supply of fluid than the ends thereof. This insures that a larger amount of solvent will be supplied to the central portion of the solvent-applying feed roller than will be applied to the ends thereof and insures proper distribution of the solvent on the copy sheets.

Other objects and advantages will become apparent as the following detailed description progresses, reference being had to the accompanying drawings, wherein—

Referring for the present to Figs. 1 to 4, inclusive, wherein a preferred embodiment of the invention is illustrated, the reference character 10 designates generally the frame of the improved duplicating machine, which frame 10 comprises side frames 11 and 12 between which most of the mechanism of the machine is mounted.

Figure 1:
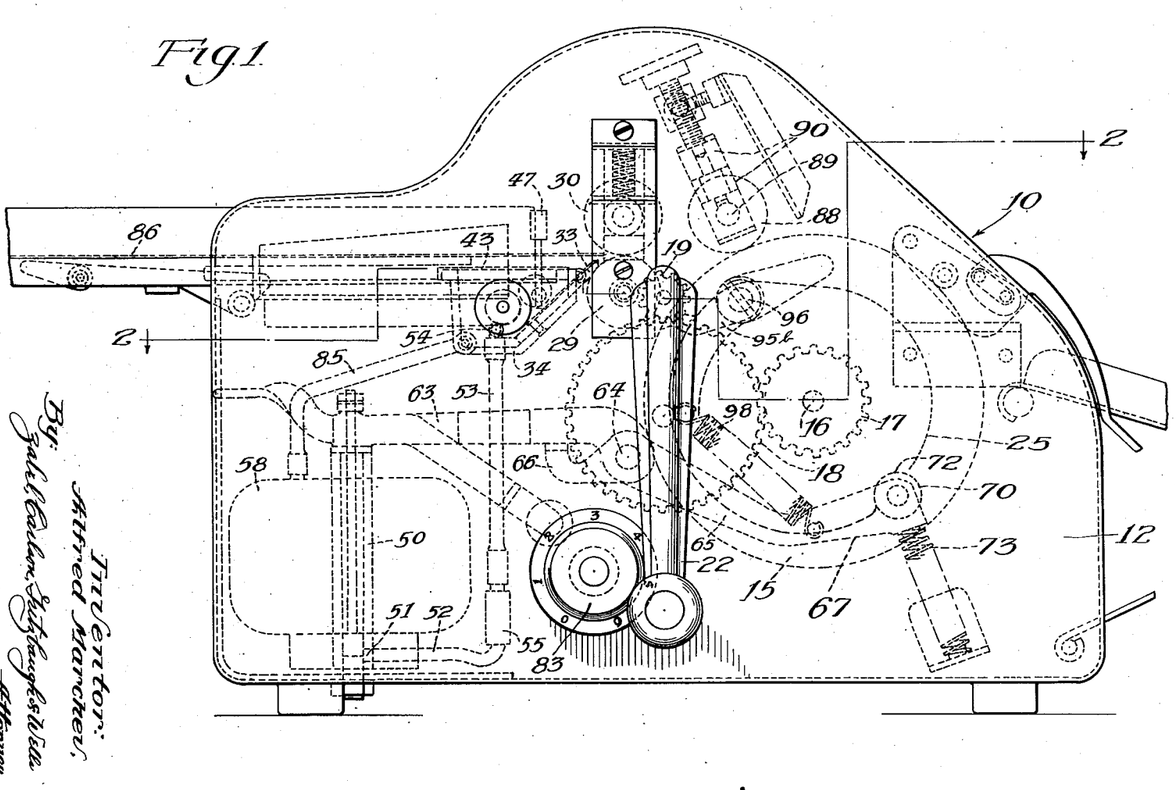
Fig. 1 is a side elevation of a duplicating machine which embodies one form of the invention.
Figure 2:
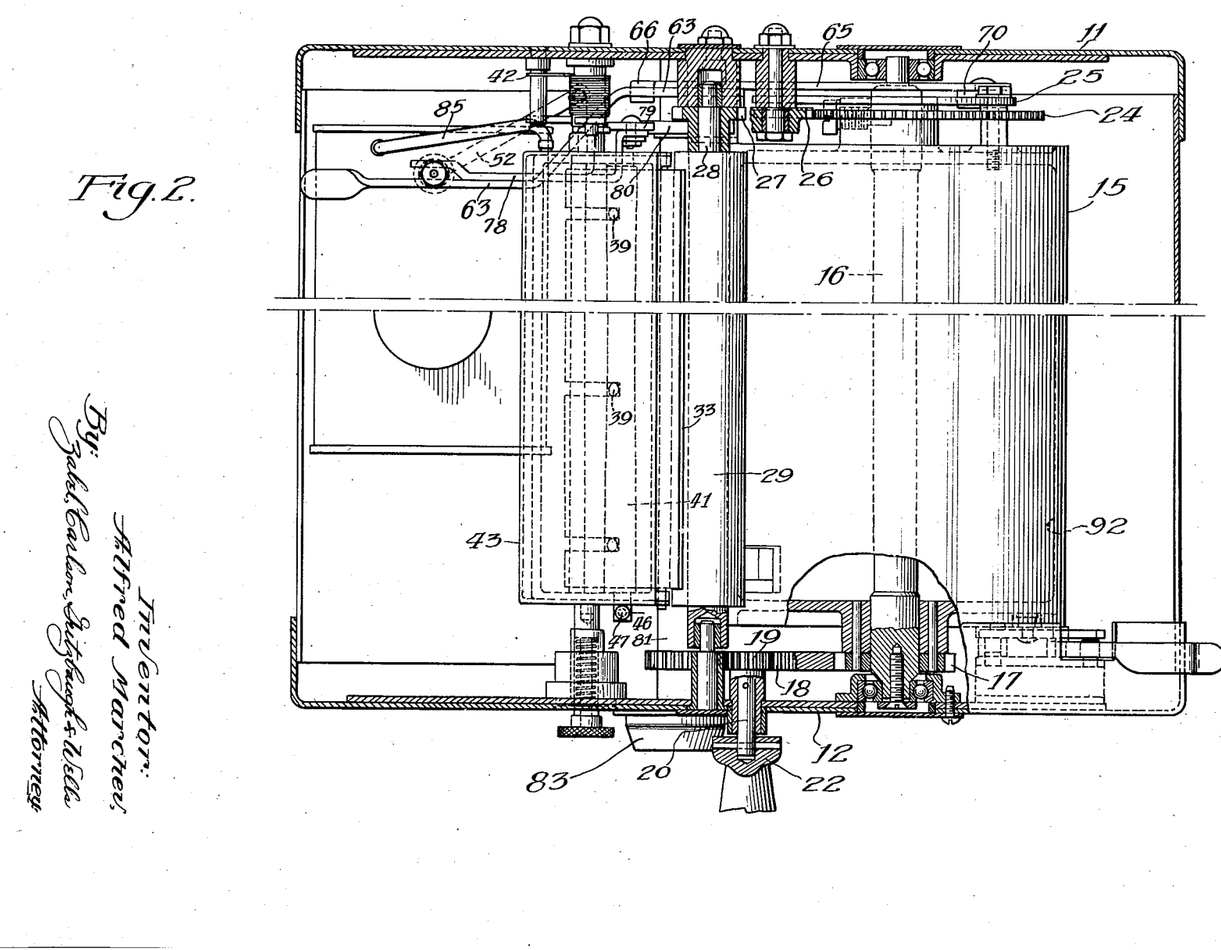
Fig. 2 is a plan section taken on line 2—2 of Fig. 1.

The machine shown in Figs. 1 to 4, inclusive, preferably comprises a duplicating cylinder or drum 15 carried by a shaft 16. A pinion 17 constrained to rotate with the drum 15 meshes with a gear 18 which, in turn, meshes with a pinion 19, the pinion 19 being fixed to a shaft 20 which is journalled in the side frame 12 (Fig. 2). Pinned to the shaft 20 is a crank arm 22 whereby the shaft may be rotated so that the drum 15 will be rotated through the pinions 17 and 19 and the gear 18. Also constrained to rotate with the drum 15 is a gear 24 and a cam 25 (Fig. 2). The gear 24 meshes with a pinion 26 which, in turn, meshes with a pinion 27, the pinion 27 being fixed to a shaft 28 upon which is mounted a feed roller 29 which co-operates with a feed roller 30 to advance copy sheets to the duplicating cylinder or drum 15. Obviously, the feed roller 29 will be driven whenever the drum 15 is rotated. The roller 29 will drive the roller 30 through frictional contact therewith. The roller 29 is preferably formed from rubber or some other non-porous material. The roller 30 may be provided with a felt coating 31 to absorb excess solvent at the bight between the rollers 29 and 30.

Engaging the roller 29 is a felt strip 33 which projects from a receptacle or container 34 mounted in the frame 10 between the side frames 11 and 12. The container 34 comprises a bottom wall 35 and an inclined side wall 36 adjacent the roller 29. The upper end of the wall 36 is slotted as at 37 to permit the felt strip 33 to project from the container. The felt strip 33 is held against the wall 36 by means comprising a sheet metal plate 38 having slots 39 which accommodate pins 40. An eccentrically mounted roller 41 bears against the upper or outer side of the plate 38 for a purpose which will hereinafter appear.

Figure 3:
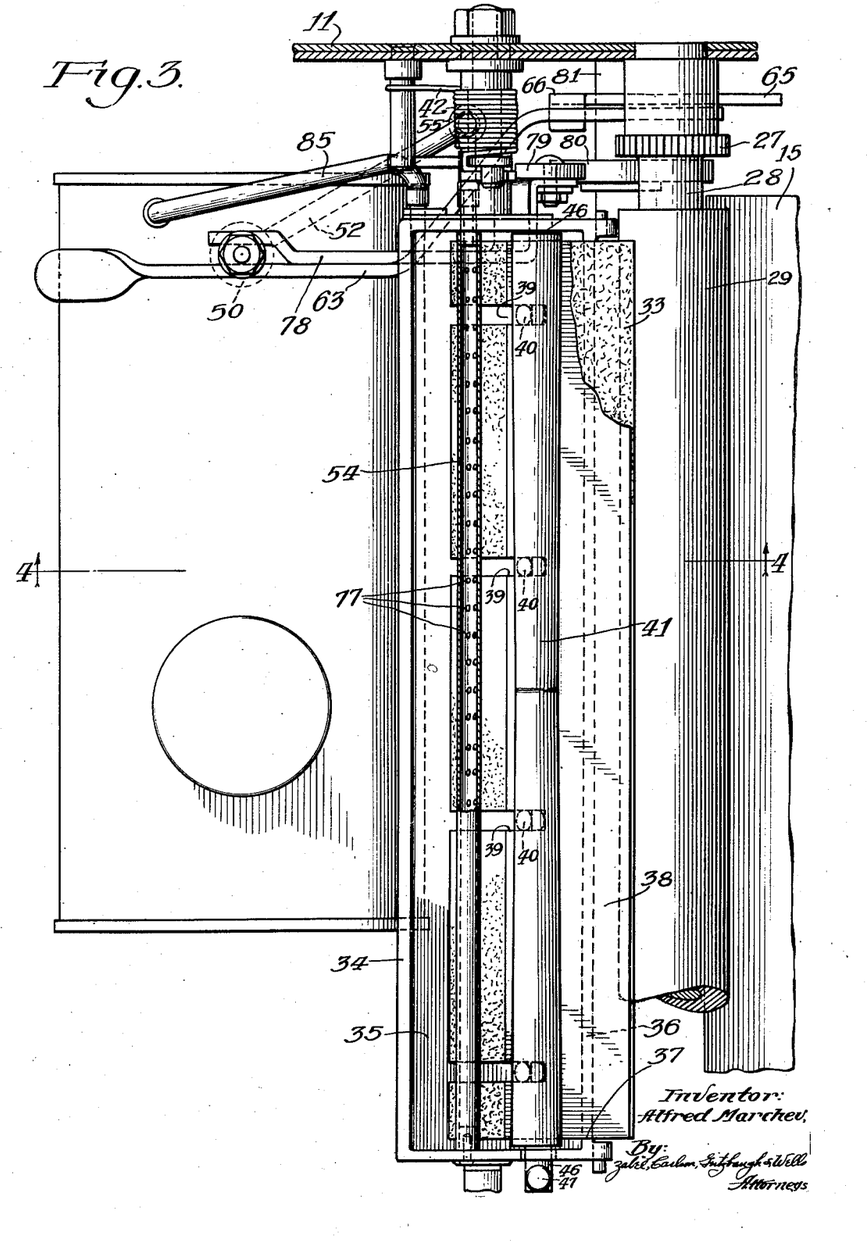
Fig. 3 is a fragmentary plan section taken substantially on the same line as Fig. 2 but leaving out a certain part and showing another partly in section.

The details of construction of the container 34 do not form a part of this invention, it being sufficient to state that the container 34 is pivotally mounted in the frame 10 and is yieldingly urged in a clockwise direction (Fig. 4) by a spring 42 so that the upper edge of the felt strip 33 is urged yieldingly against the roller 29. The container 34 is covered by a plate 43 which is omitted from Fig. 3 so that certain details of construction shall be disclosed more clearly. The roller 41 is provided with trunnions 46 which are journalled in the end walls of the container 34, the roller being eccentrically mounted as pointed out above. Fixed to one of the trunnions 46 is a lever 47 whereby the roller 41 may be displaced angularly around the axis of rotation of the trunnions 46. As best shown in Fig. 3, the roller 41 is slightly smaller in diameter at a point substantially midway its ends and tapers gradually from this point to the larger ends. Obviously, the ends of the roller 41 will bear with more pressure against the ends of the plate 38 than the central portion of the roller will bear against the central portion of the plate and the plate 38 is flexible enough so that it will bear with more pressure against the ends of the felt strip 33 than it will against the central portion of the strip. Obviously, the end portions of the strip will be compressed and when solvent is supplied to the lower end of the strip or wick 33, more of the solvent will flow upwardly through the central portion of the wick by capillary action than will flow up through the end portions thereof. This insures that the central portions lengthwise of the copy sheets will receive more solvent than the lengthwise marginal portions of the copy sheets, it being understood that for the purpose of this disclosure the word "lengthwise" describes the direction in which the copy sheets travel through the machine.

The solvent is supplied to the felt strip or wick 33 by means comprising a pump 50 having a discharge port 51 which is connected by tubes 52 and 53 to a perforated tube 54 projecting into the container 34 so that it extends over the bottom end of the wick 33 for the entire length thereof. Intermediate the tubes 52 and 53, a check valve 55 is provided to prevent the solvent from flowing back into the pump 50 through the tube 52. It will be noted that the pump 50 extends through a reservoir 58 adapted to hold a relatively large quantity of the solvent and that the pump 50 is provided with intake ports 59 communicating with the interior of the reservoir 58. The pump 50 comprises a piston 60 which is reciprocated by means comprising a spring 62 and a lever 63, the lever 63 being pivoted upon a pin 64, the lever 63 being oscillated, in turn, by a lever 65 which is also pivoted upon the pin 64 and is provided with an arm 66 which bears against the bottom edge of the lever 63. The lever 65 comprises a second arm 67 which is provided at its free end with a roller 70 which rides upon the cam 25, the cam 25 being provided with a notch 72 into which the roller 70 enters at the end of each cycle of operations of the improved machine. A compression spring 73 yieldingly urges the lever 67 in a counterclockwise direction (Fig. 1) so that the roller 70 remains in contact with the cam 25 and enters the notch 72 whenever the notch 72 is aligned with the roller 70. Obviously, when the cam 25 is rotating, the lever 65 will be oscillated and it, in turn, will co-operate with the spring 62 to oscillate the lever 63 so that the piston 60 is reciprocated to force the solvent into the perforated tube 54. The solvent drops onto the bottom end of the wick 33 through perforations 77 in the tube 54. Secured to the lever 63 is an arm 78 provided with a roller 79 which rides upon a cam 80, the cam 80 being fixed to a shaft 81 which may be displaced angularly by rotating a knob 83 (Figs. 1 and 2). It will be obvious that if the cam 80 is rotated, the lever 63 will be raised or lowered depending on the direction in which the cam 80 is rotated and this will regulate the amount of solvent the pump 50 delivers to the container 34. Excess solvent in the container 34 will drain therefrom through a tube 85 which has its lower end communicating with the interior of the reservoir 58.

The improved machine preferably comprises a feed table 86 upon which a stack of copy sheets may be placed and advanced one by one to the bight of the rollers 29 and 30.

Co-operating with the drum 15 is a platen or pressure roller 88 which is preferably formed from rubber or some other somewhat resilient material. The roller 88 is mounted on a shaft 89 which is rotatably journalled in suitable mechanism 90 mounted between the frames 11 and 12, the mechanism 90 being shown in dotted lines in Fig. 1. The details of the mechanism 90 do not form a part of this invention.

Figure 4:
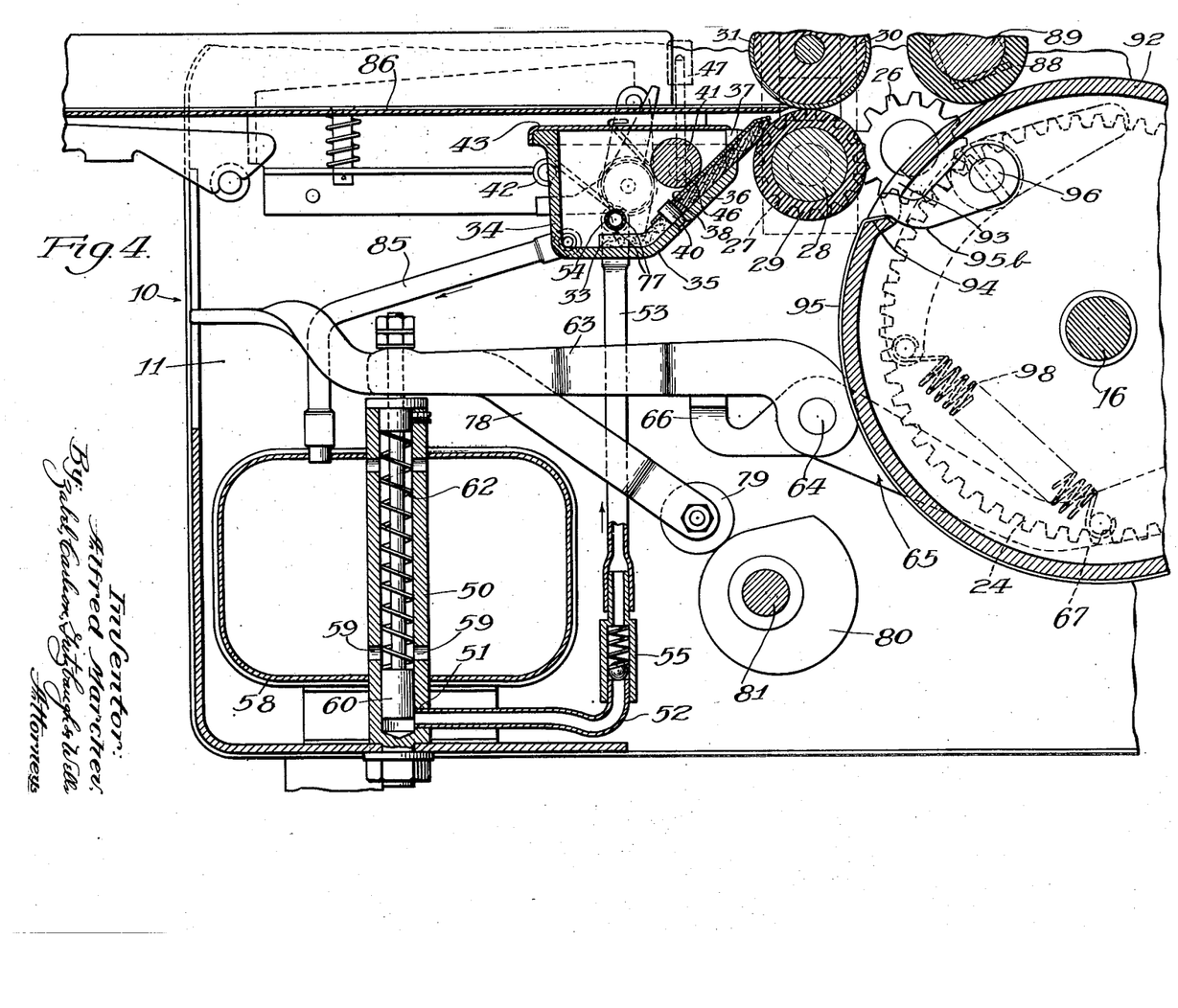
Fig. 4 is a section taken on line 4—4 of Fig. 3.

As best shown in Fig. 4, the drum 15 is hollow and comprises a cylindrical wall 92 which has a slot 93 extending longitudinally of it. The slot 93 has an inclined surface 94 against which the leading end of a master sheet 95 may be clamped by a plurality of clamping fingers 95b which are pivoted upon a shaft 96 journalled in the drum 15, the fingers being yieldingly urged into their clamping positions by means preferably comprising a spring 98.

The master sheet 95 comprises a sheet of paper, or the equivalent, upon the exposed surface of which data to be copied is printed, typewritten or written in reverse so that when copy sheets are pressed against it, the copies will be positives. It is to be understood that the solvent contained in the reservoir 58 is a solvent for the ink or carbon with which the data is formed upon the master sheet 95.

The operation of the above described machine is substantially as follows: If it is assumed that the copy sheet 95 is in place upon the drum 15 as illustrated in the drawings and if it is assumed that there is a quantity of solvent in the reservoir 58, it will be readily understood that when the crank arm 22 is rotated, rotation will be imparted to the drum 15 and also to the roller 29 which will drive the roller 30. The platen roller 88 will be driven because of its frictional contact with the cylindrical surface of the drum 15. It will also be understood that the cam 25 will actuate the levers 65 and 63 so that the pump 50 will deliver solvent to the container 34 and the solvent will fall through the apertures 77 onto the lower end of the wick 33, whereupon the solvent will gravitate upwardly through the wick and be delivered to the roller 29. The action of the roller 70 and the notch 72 is such that the operator will feel when the roller 70 enters the notch 72 to indicate the completion of a cycle of operations. Now if the apparatus is adjusted as illustrated in the drawings, a copy sheet may be advanced to the bight of the rollers 29 and 30 after which the crank arm 22 may be rotated so that the feed rollers 30 and 29 advance the leading edge of the copy sheet to the bight between the platen roller 88 and the drum 15. As the copy sheet passes between the rollers 29 and 30, the underside of the copy sheet is moistened with the solvent. As the drum 92 continues to rotate, the moistened surface of the copy sheet comes into contact with the master sheet 95 so that the solvent will dissolve minute quantities of the carbon or ink on the master sheet and cause them to adhere to the copy sheet so that the data on the master sheet appears in positive upon the copy sheet. When the copy sheet is discharged from the machine, the roller 70 engages the notch 72 and the operator ceases revolving the crank arm 22 until the following copy sheet has been advanced to the bight of the rollers 29 and 30.

The amount of solvent supplied to the copy sheets is controlled partly by the cam 80 and partly by the eccentrically mounted roller 41, it being obvious that the cam 80 controls the amount of solvent delivered to the lower end of the wick 33 and that the roller 41 controls the flow of solvent through the wick 33. In practice, it has been found that the platen roller 88 tends to bow so that its central portion does not engage the drum 15 with as much pressure as at its ends. Therefore, there is a tendency that the data in the lengthwise central portion of each copy sheet will be somewhat light in color as compared to the remainder of the data copied on the copy sheet. However, by employing the roller 41 with its central portion of smaller diameter a larger amount of solvent is delivered to the central portion of the roller 29 and hence a larger amount of solvent is delivered to the central lengthwise portion of each copy sheet so as to compensate for the decreased pressure at this point by the platen roller, with the result that the completed copy sheet will have the data transferred to it in such manner that it will appear of equal intensity over the entire sheet as far as its color is concerned. As the roller 41 is shown in Fig. 4, it exerts the least pressure possible on the wick 33 but it will be readily understood that if the roller 41 is displaced angularly in either direction on its trunnions 46, more pressure will be exerted upon the wick 33.

Figure 5:
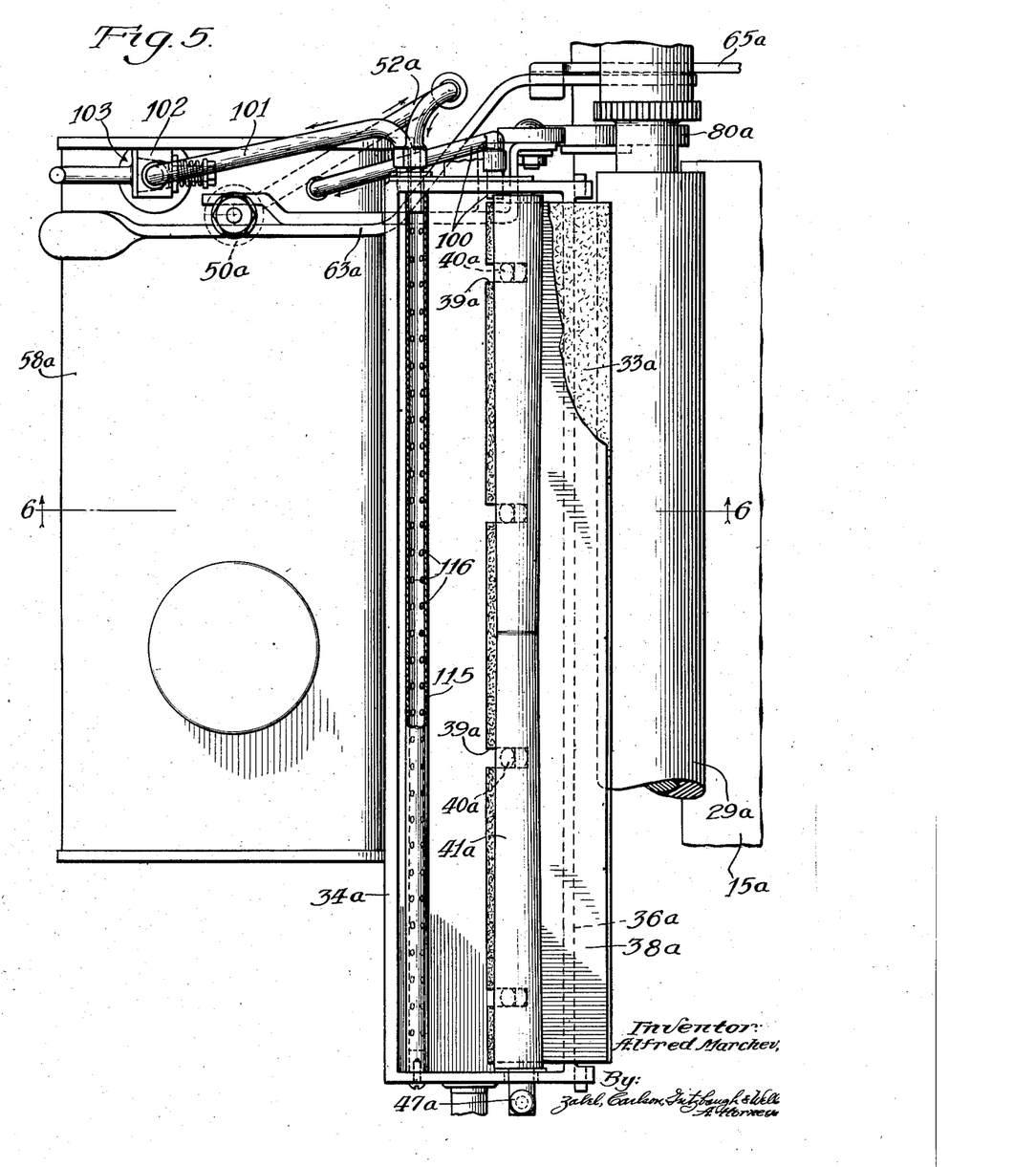
Fig. 5 is a fragmentary plan section corresponding to Fig. 3 but showing another form of the invention.
Figure 6:
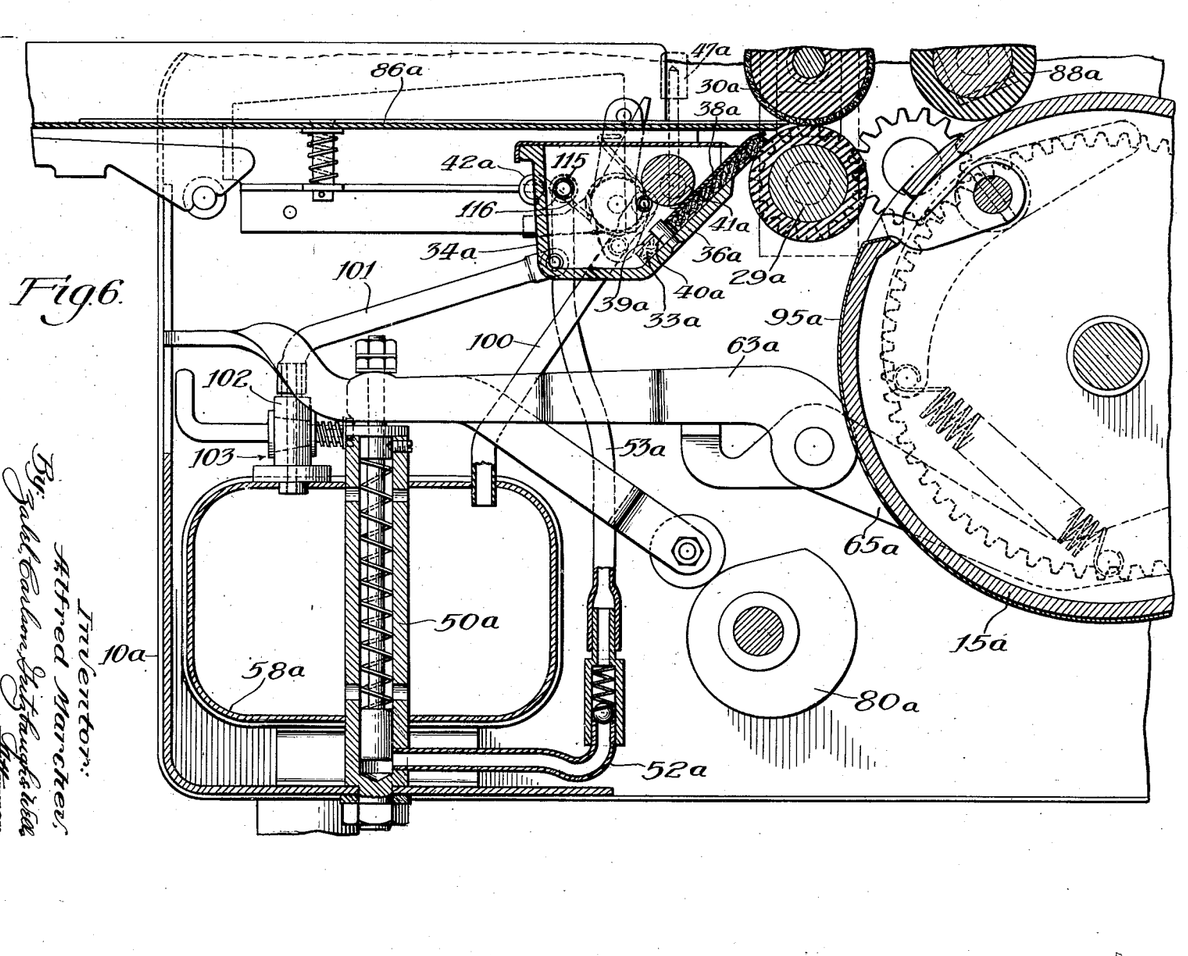
Fig. 6 is a section taken on line 6—6 of Fig. 5.

Referring now to Figs. 5 and 6 wherein another form of the invention is illustrated in a duplicating machine of the same type as that shown in Figs. 1 to 4, inclusive, the reference character 15a designates a duplicating cylinder or drum which is identical with the drum 15 described above and is rotated by mechanism (not shown) similar to the mechanism whereby the drum 15 is rotated. The drum 15a is rotatably mounted in a frame 10a which is substantially identical with the frame 10 described above. The drum 15a cooperates with a platen roller 88a substantially identical with the platen roller 88 described above.

The means for advancing copy sheets to the bight between the drum 15a and the platen roller 88a comprises feed rollers 29a and 30a which are identical in construction with the feed rollers 29 and 30 described above, the feed roller 29a being driven through suitable gearing so that it rotates in unison with the drum 15a. The roller 29a is adapted to apply solvent to the bottom surfaces of copy sheets when they pass between the rollers 29a and 30a. The solvent is supplied to the roller 29a by a wick 33a which projects from a receptacle or container 34a which, except for some minor details, is identical in construction with the container 34 described above. The container 34a has an inclined wall 36a against which the wick 33a is disposed, the wick being clamped between the wall 36a and a thin plate 38a formed from sheet metal or any other material which is sufficiently flexible for the purpose hereinafter set forth. The plate 38a is slotted as at 39a to receive pins 40a which project from the wall 36a. The plate 38a is urged against the wick 33a by an eccentrically mounted roller 41a which is preferably identical in construction with the roller 41 described above, the roller 41a being reduced in diameter at a point substantially midway between its ends and tapering from this point, to the larger ends. The function of the roller 41a is identical with the function of the roller 41 described above. The container 34a is pivotally mounted and is yieldingly urged by a spring 42a in a clockwise direction (Fig. 6) to hold the upper end of the wick 33a against the feed roller 29a.

It will be noted that the roller 41a is provided with a lever 47a whereby the roller may be brought into a plurality of adjusted positions.

The container 34a is supplied with solvent through tubes 52a and 53a by a pump 50a. The pump 50a is identical with the pump 50 described above and projects through the reservoir 58a which, except for minor details, is identical with the reservoir 58. Communicating with the interior of the container 34a at a point below the roller 41a is a flexible tube 100 which has its lower end projecting into the reservoir 58a. Also communicating with the container 34a at a point adjacent its bottom wall is a flexible tube 101 which has its lower end fixed to a valve casing 102 of a valve 103. When the valve 103 is opened, it permits the contents of the container 34a to drain into the reservoir 58a but when it is in its closed position and solvent is supplied to the container 34a through the tubes 52a and 53a the level of the solvent in the container 34a will rise until it is of sufficient height to drain through the tube 100 after which the level of the solvent in the container 34a remains substantially constant.

The pump 50a is actuated by levers 63a and 65a which are preferably identical with the levers 63 and 65 described above, these levers 63a and 65a being actuated by mechanism (not shown) which is identical with the mechanism which actuates the levers 63 and 65. The amount of solvent discharged from the pump 50a is controlled by a cam 80a which is identical with the cam 80 described above and functions in the same manner. The amount of solvent applied to the roller 29a by the wick 33a is controlled by the roller 41a which may be adjusted to compress the wick 33a the desired amount. The more the wick is compressed the less solvent will pass upwardly through it by capillary action. As the roller 41a is of the same shape as the roller 41, it functions in the same manner and permits more solvent to flow on the central portion of the wick so that the roller 29a will apply more solvent to the lengthwise central portion of each copy sheet. It will be noted that the main difference between the structure shown in Figs. 1 to 4, inclusive, and the structure shown in Figs. 5 and 6 is that in the first instance the solvent is sprayed upon one end of the wick while in Figs. 5 and 6 the lower end of the wick is immersed in a quantity of the solvent.

The machine shown in Figs. 5 and 6 is shown with a feed table 86a over which the copy sheets are advanced to the bight of the rollers 29a and 30a, which rollers advance each copy sheet to the bight on the drum 15a and the roller 88a so that the moistened surface of each copy sheet is pressed against a master sheet 95a carried by the drum 15a.

As best shown in Figs. 5 and 6, the tube 53a does not communicate directly with the interior of the container 34a but is secured to one end of a tube 115 extending lengthwise of the container, the tube 115 being provided with perforations 116 through which the solvent is discharged into the container.

Figures 7, 8:
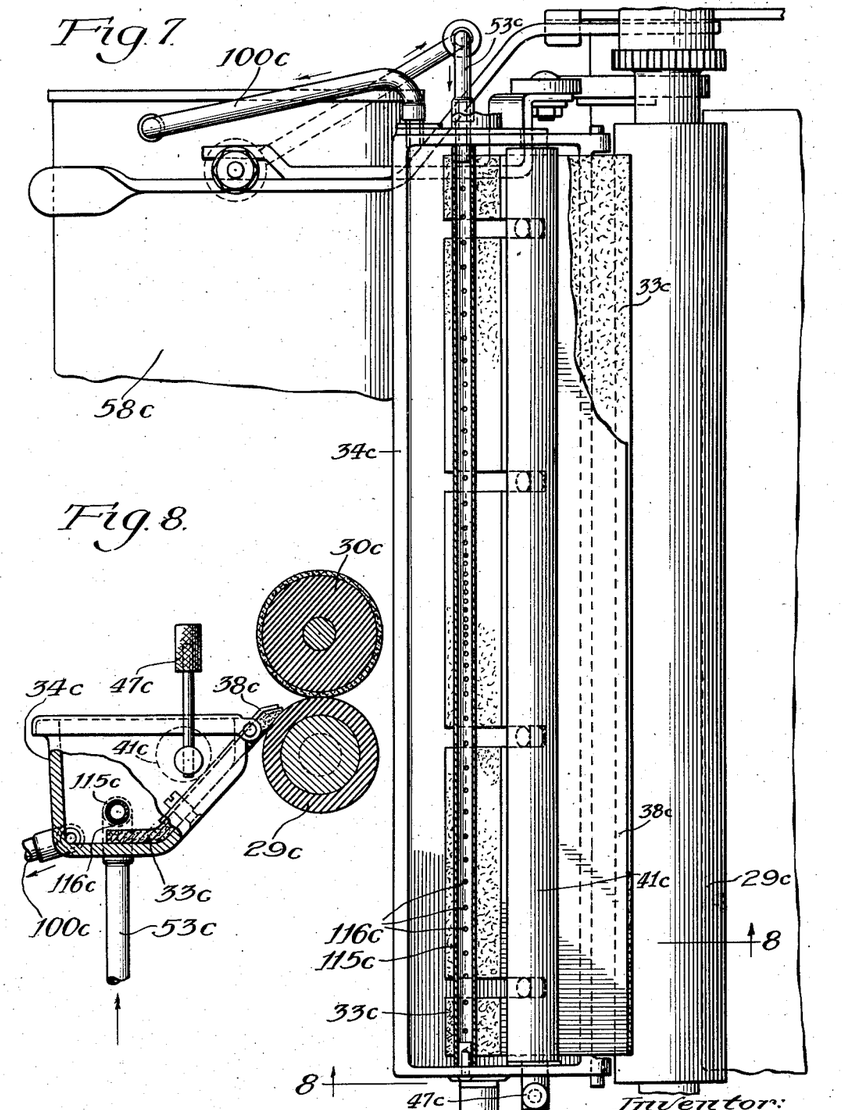
Fig. 7 is a fragmentary plan section corresponding to Fig. 3 but disclosing still another form of the invention.
Fig. 8 is a section taken on line 8—8 of Fig. 7.

Referring now to Figs. 7 and 8 wherein apparatus embodying still another form of the invention is illustrated, the reference characters 29c and 30c designate two rollers of a duplicating machine which is identical in construction with the machine shown in Figs. 1 to 4, inclusive, except for the fact that the details of the means for applying solvent to the roller 29c is different than the means for applying the solvent to the roller 29 described above. The pump for discharging or withdrawing solvent from the reservoir 58c is identical with the pump 50 described above and is adapted to discharge the solvent into a container 34c through a flexible tube 53c and a perforated tube 115c. As best shown in Fig. 7, the tube 115c extends transversely of the duplicating machine and its perforations 116c are somewhat bunched at a point substantially midway between the ends of the tube which, of course, is aligned with the lengthwise central portion of each copy sheet passing through the duplicating machine. The perforations 116c are spaced farther and farther apart as the ends of the tube 115c are reached. Projecting from the container 34c is a felt strip or wick 33c which has its lower end disposed beneath the tube 115c so that solvent dropping through the perforations 116c will fall upon the wick. A plate 38c bears against an upwardly inclined portion of the wick 33c and is held thereagainst by a roller 41c which is preferably cylindrical in shape and is eccentrically mounted in the end walls of the container 34c. The roller 41c is provided with a lever 47c whereby the roller may be displaced angularly to increase or decrease the amount the wick 33c is compressed by the plate 38c.

Excess solvent gravitates from the container 34c to the reservoir 58c through a tube 100c.

The wick 33c contacts the roller 29c and applies the solvent thereto. The container 34c is mounted in the same manner as the container 34 described above so that it is yieldingly urged around a pivotal axis in a clockwise direction (Fig. 8) to have the wick 33c engage the roller 29c at all times. The rollers 29c and 30c are preferably identical in construction with the rollers 29 and 30 described above.

When the duplicating machine, partly shown in Figs. 7 and 8, is in operation, the copy sheets are advanced over a table (not shown) to the bight of the rollers 29c and 30c and these rollers advance the copy sheets to the duplicating drum and its co-operating platen rollers (not shown). As the copy sheets pass between the rollers 29c and 30c, the solvent is applied to the bottom surfaces thereof. The large number of perforations 116c near the center of the tube 115c causes a larger amount of solvent to be applied to the central portion of the wick 33c than is applied to the ends of the wick. Therefore, a larger amount of solvent will be applied to the central lengthwise portions of the copy sheets and good copies will be obtained as explained in connection with Figs. 1 to 4, inclusive.

In this disclosure, the word "wick" is employed in such manner that it includes any fibrous or other material through which liquid will flow by capillary action.

It will be understood that in each of the above described forms of the invention, the pump controls the total amount of solvent provided for moistening the copy sheets and that this amount may be varied at the will of the operator. The eccentrically mounted rollers also control the total amount of solvent delivered for use on the copy sheets. The eccentrically mounted rollers shown in the forms of the invention illustrated in Figs. 1 to 6, inclusive, not only control the total amount of solvent delivered to the combined moistening and feeding rollers, but also control the distribution of the solvent to insure that certain portions of the copy sheets have more solvent applied to them than other portions thereof.

While I have shown and described certain embodiments of my invention, it is to be understood that it is capable of many modifications. Changes, therefore, in the construction and arrangement may be made without departing from the spirit and scope of the invention as disclosed in the appended claims, in which it it my intention to claim all novelty inherent in my invention as broadly as permissible, in view of the prior art.

I claim:

1. In a duplicating machine, means for applying solvent to copy sheets comprising a pair of rollers between which the sheets pass, a wick for supplying the solvent to one of said rollers, a reservoir for holding a supply of solvent, a pump for pumping the solvent from said reservoir to said wick, an eccentrically mounted roller for compressing said wick to control the flow of solvent from said wick to said roller receiving solvent from said wick, and means for angularly displacing said eccentrically mounted roller.

2. In a duplicating machine, means for applying solvent to copy sheets comprising a pair of rollers between which the sheets pass, a wick for applying the solvent to one of said rollers, an eccentrically mounted roller for compressing said wick to control the flow of solvent therethrough, and means for displacing said eccentrically mounted roller angularly to vary the flow of solvent through said wick.

3. In a duplicating machine, means for applying solvent to copy sheets comprising a pair of rollers between which the sheets pass, a drum adapted to carry a master sheet thereon to which said copy sheets pass, a platen pressing said copy sheets against a master sheet on the drum and methodically applying greater pressure to said sheets at one point longitudinally of the drum than at another point and means contacting one of said rollers to apply the solvent thereto for transfer to said copy sheets, said means applying a larger amount of solvent to that portion of the roller contacting the copy sheets at the points where they are later pressed with the least force against the master sheet by the platen.

4. In a duplicating machine, means for applying solvent to copy sheets comprising a pair of rollers between which the sheets pass, a wick for applying the solvent to one of said rollers, a container from which said wick projects, a reservoir for the solvent, a pump for pumping said solvent from said reservoir to said container, means whereby excess solvent in said container drains back to said reservoir, and valve controlled means whereby all of the solvent in the container may drain back to said reservoir.

5. In a duplicating machine, means for applying solvent to copy sheets including a wick, a tube disposed above said wick and having a plurality of perforations therein through which solvent may fall on said wick, there being a larger number of perforations in one portion of the tube in proportion to its length than there is in another whereby a larger amount of solvent is supplied to one portion of the wick per unit of length than is supplied to another portion thereof, and means for supplying solvent to said tube.

6. In a duplicating machine, means for applying solvent to copy sheets comprising a pair of rollers between which the sheets pass, a wick for applying the solvent to one of said rollers, a container from which said wick projects, a tube disposed in said container and having a plurality of perforations therein through which solvent may fall on said wick, an eccentrically mounted cylindrical member in said container for controlling the flow of solvent through said wick, a reservoir for said solvent, a pump for pumping said solvent from said reservoir to said perforated tube, and means whereby excess solvent drains from said container back to the reservoir.

7. In a duplicating machine, the combination of a drum, means for mounting a master sheet on said drum so as to be carried around thereby, means for feeding a copy sheet into operative relationship to said master sheet on said drum, impression means pressing said copy sheet against said master sheet and arranged so as to apply a higher degree of pressure at the end portions of the drum than at the middle portion, and means for applying a thin film of solvent upon the face of said copy sheet and arranged so as to apply a heavier film of the solvent at the middle low pressure portion than at the end portions where the pressure is greater.

8. In a duplicating machine, the combination of a drum, means for mounting a master sheet on said drum so as to be carried around thereby, means for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, and means for applying a thin film of solvent upon the face of said copy sheet as it is fed to the drum, comprising a wick through which the solvent is fed, and means for applying pressure on said wick for controlling the feeding of solvent therethrough and arranged for applying heavier pressure on the wick opposite the end portions of the drum than at the intermediate portion of the drum.

9. In a duplicating machine, the combination of a drum, means for mounting a master sheet on said drum so as to be carried around thereby, means for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, and means for applying a thin film of solvent upon the face of said copy sheet as it is fed to the drum, comprising a wick through which the solvent is fed, a pressure bar having two operative pressure faces arranged at a slight angle with respect to each other, and means for forcing said pressure bar against the wick for causing the wick to deliver more solvent therethrough at the middle portion of the drum than at the end portions of the drum.

10. In a duplicating machine, the combination of a drum, means for mounting a master sheet on said drum so as to be carried around thereby, means for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, and means for applying a thin film of solvent upon the face of said copy sheet as it is fed to the drum, comprising a wick through which the solvent is fed, and a roller mounted eccentrically opposite to said wick so as to apply pressure on the wick when rotated, said roller being of smaller diametrical size at its middle portion than at its end portions whereby the roller applies heavier pressure on the wick for cutting down the amount of solvent passing through the wick at the points where the platen presses more heavily on the drum.

11. In a duplicating machine, the combination of a drum, means for mounting a master sheet on said drum so as to be carried around thereby, a pair of rollers adjacent to said drum for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, a receptacle mounted adjacent to said rollers, a wick mounted in said receptacle in position to engage one of said rollers, means for delivering a supply of solvent to said receptacle and wick, and means for applying varying pressure on said wick at different points therealong for controlling the delivery of solvent therethrough and arranged so that the amount of solvent delivered by the wick at different points is substantially inversely proportional to the pressure of the platen roller on the drum at corresponding points.

12. In a duplicating machine, the combination of a drum, means for mounting a master sheet on said drum so as to be carried around thereby, a pair of rollers adjacent to said drum for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, a receptacle mounted adjacent to said rollers, a wick mounted in said receptacle in position to engage one of said rollers, means for delivering a supply of solvent to said receptacle and wick, and a roller mounted eccentrically opposite to said wick so as to apply pressure on the wick when rotated, said roller being of smaller diametrical size at its middle portion than at its end portions whereby the roller applies heavier pressure on the wick at the end portions for cutting down the amount of solvent passing through the wick at said end portions as compared with the amount at the middle of the roller.

13. In a duplicating machine, the combination of a drum, means for mounting a master sheet on said drum so as to be carried around thereby, means for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, and means for applying a thin film of solvent upon the face of said copy sheet as it is fed to the drum, comprising a wick through which the solvent is fed, and means for feeding a varying amount of solvent to said wick at different points therealong and arranged so that a greater amount of the solvent is fed at the points of least pressure by the platen roller on the drum.

14. In a duplicating machine, the combination of a drum, means for mounting a master sheet on said drum so as to be carried around thereby, means for feeding a copy sheet into operative relationship to said master sheet on said drum, a platen roller rotatably mounted in impression relationship to said drum serving to press said copy sheet against said master sheet and adapted to apply a higher degree of pressure at the end portions of the drum than at the intermediate portion, and means for applying a thin film of solvent upon the face of said copy sheet as it is fed to the drum, comprising a wick through which the solvent is fed, and means for feeding a varying amount of solvent to said wick at different points therealong, comprising a pipe extending along above said wick and having openings therefrom through which solvent is deposited on the wick, said openings being arranged for delivering an increased amount of the solvent therethrough at the intermediate portion as compared with that delivered at the ends of the wick.

ALFRED MARCHEV.